United States Patent
Stone et al.

(10) Patent No.: US 7,997,793 B2
(45) Date of Patent: Aug. 16, 2011

(54) THERMOMETER HEATER AND THERMISTOR

(75) Inventors: Ray D. Stone, Camillus, NY (US); Richard W. Newman, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 632 days.

(21) Appl. No.: 12/122,916

(22) Filed: May 19, 2008

(65) Prior Publication Data

US 2009/0285260 A1 Nov. 19, 2009

(51) Int. Cl.
*G01K 7/00* (2006.01)
*G01K 7/22* (2006.01)

(52) U.S. Cl. ........ 374/164; 374/170; 374/208; 374/185; 600/549

(58) Field of Classification Search .................. 374/100, 374/163, 164, 170, 178, 179, 183, 185, 208, 374/120, 121, 29, 43–44; 600/549, 474; 702/130–136, 139; 73/866.5

See application file for complete search history.

(56) References Cited

U.S. PATENT DOCUMENTS

| | | | | |
|---|---|---|---|---|
| 3,332,285 A | * | 7/1967 | Cook | 374/134 |
| 3,834,237 A | * | 9/1974 | Robertson | 374/134 |
| 3,915,003 A | * | 10/1975 | Adams | 374/164 |
| 4,673,300 A | * | 6/1987 | Wilhelmson et al. | 374/182 |
| 4,899,741 A | * | 2/1990 | Bentley et al. | 606/27 |
| 5,035,514 A | * | 7/1991 | Newman | 374/164 |
| 5,042,294 A | * | 8/1991 | Uzzell | 73/75 |
| 5,973,296 A | | 10/1999 | Juliano et al. | |
| 6,037,574 A | | 3/2000 | Lanham et al. | |
| 6,222,166 B1 | | 4/2001 | Lin et al. | |
| 7,722,247 B2 | * | 5/2010 | Yerlikaya | 374/100 |
| 2002/0195444 A1 | | 12/2002 | Lin et al. | |
| 2003/0002561 A1 | * | 1/2003 | Yu | 374/164 |
| 2003/0023398 A1 | * | 1/2003 | Lantz et al. | 702/130 |
| 2005/0281314 A1 | * | 12/2005 | Fraden | 374/208 |
| 2007/0055171 A1 | * | 3/2007 | Fraden | 600/549 |
| 2007/0242726 A1 | * | 10/2007 | Medero | 374/164 |

FOREIGN PATENT DOCUMENTS

WO   WO 01/31305 A1   5/2001

* cited by examiner

*Primary Examiner* — Gail Verbitsky
(74) *Attorney, Agent, or Firm* — Sonny Z. Zhan

(57) ABSTRACT

A thermometric apparatus for determining a patient's temperature having a elongated sensing probe that is connected to a base housing. The insertion tip of the probe contains a outer shell and a spaced apart inner shell. The outer surface of the inner shell has a heater that is fabricated of a resistive thick film material and a heat sensor mounted thereon. The heater and the heat sensor are connected to a pair of thick film conductive traces which in turn are electrically attached by a flexible circuit board to leads running back to the base housing. The space between the two shells is filled by a thermally conductive epoxy.

15 Claims, 2 Drawing Sheets

THERMOMETER HEATER AND THERMISTOR

FIELD OF THE INVENTION

This invention relates generally to an electronic thermometer and, in particular, to an electronic thermometer having an improved heat sensing probe tip.

BACKGROUND OF THE INVENTION

Electronic thermometers for measuring a patient's body temperature via a slim temperature probe have been in use for quite some time and have proven their worth in health care facilities as well as in the hands of patients themselves. Typically this type of thermometer includes a portable base housing having a processor for processing data provided by sensing elements generally located at the tip end of a rather small diameter probe. The patient temperature is determined from the data and displayed visually upon a viewing screen such as an LCD. Electronic thermometers of this type are disclosed in detail in U.S. Pat. Nos. 5,632,555; 6,000,846; 6,036,361; 6,827,488 and 6,971,790, the disclosures of which are incorporated herein by reference and are commercially available through Welch Allyn, Inc. which is the common assignee of these patents.

As noted in the above mentioned prior art patents, the tip end of the sensing probe is generally equipped with a heater for bringing the tip up to a desired threshold temperature and a temperature sensor for providing accurate information concerning the actual tip temperature. The response time of the tip is typically four seconds or more. Because of the limited space available inside the probe tip, mounting the heater and the heat sensing element within the tip has proven to be difficult. Epoxy bonds are used to secure the heater and the heat sensor to the interior surface of the tip. Some epoxies degrade with use, and the heater elements tend to overheat causing both epoxy and solder bonds to fail. In addition some epoxies are not good thermal conductors and thus can disrupt the heat flow through the tip producing erroneous temperature readings. A thermistor is generally provided in the heater circuitry to insure that the heater does not overheat, however, the use of the thermistor increases the overall cost of the system.

SUMMARY OF THE INVENTION

It is therefore a primary object of the current invention to improve temperature sensing probes used in electronic thermometers.

It is a further object of the present invention to reduce the number of probe failures in electronic thermometers.

A still further object of this invention is to eliminate the need of an over heat thermistor in the tip heating circuit of an electronic thermometer.

Another object of the present invention is to reduce the time needed to heat up the probe sensing tip of an electronic thermometer.

Yet another object of the present invention is to improve the heat transfer characteristics of a temperature sensing probe.

While a still further object is to reduce the cost of manufacturing a heat sensing probe of the type employed in electronic thermometers.

These and further objects of the present invention are attained by means of a temperature sensing probe having an elongated hollow shaft that is attached at its proximal end to a base housing and has a temperature sensing tip at its distal end. The tip contains an outer shell and an inner shell mounted therein to provide a space between the two shells. A heater is mounted on the outer surface of the inner shell along with a temperature sensing element. Electrical lead that pass through the shaft are connected to the heater and the heat sensing element by pairs of thick film conductive traces that are painted upon the outer surface of the inner shell. A heating element in the form of a thick film resistive member is connected between one pair of traces while the heat sensor is connected between the second pair of traces. Appropriate electric leads couple the traces to a power source and a processor found within the base housing. A thermally conductive epoxy fills the space between the two shells to provide for rapid heat transfer through the space.

BRIEF DESCRIPTION OF THE DRAWINGS

For a better understanding of these and other objects of the invention reference will be made to the following detailed description of the invention which is to be read in conjunction with the accompanying drawings, wherein.

DESCRIPTION OF THE INVENTION

Figure 1:
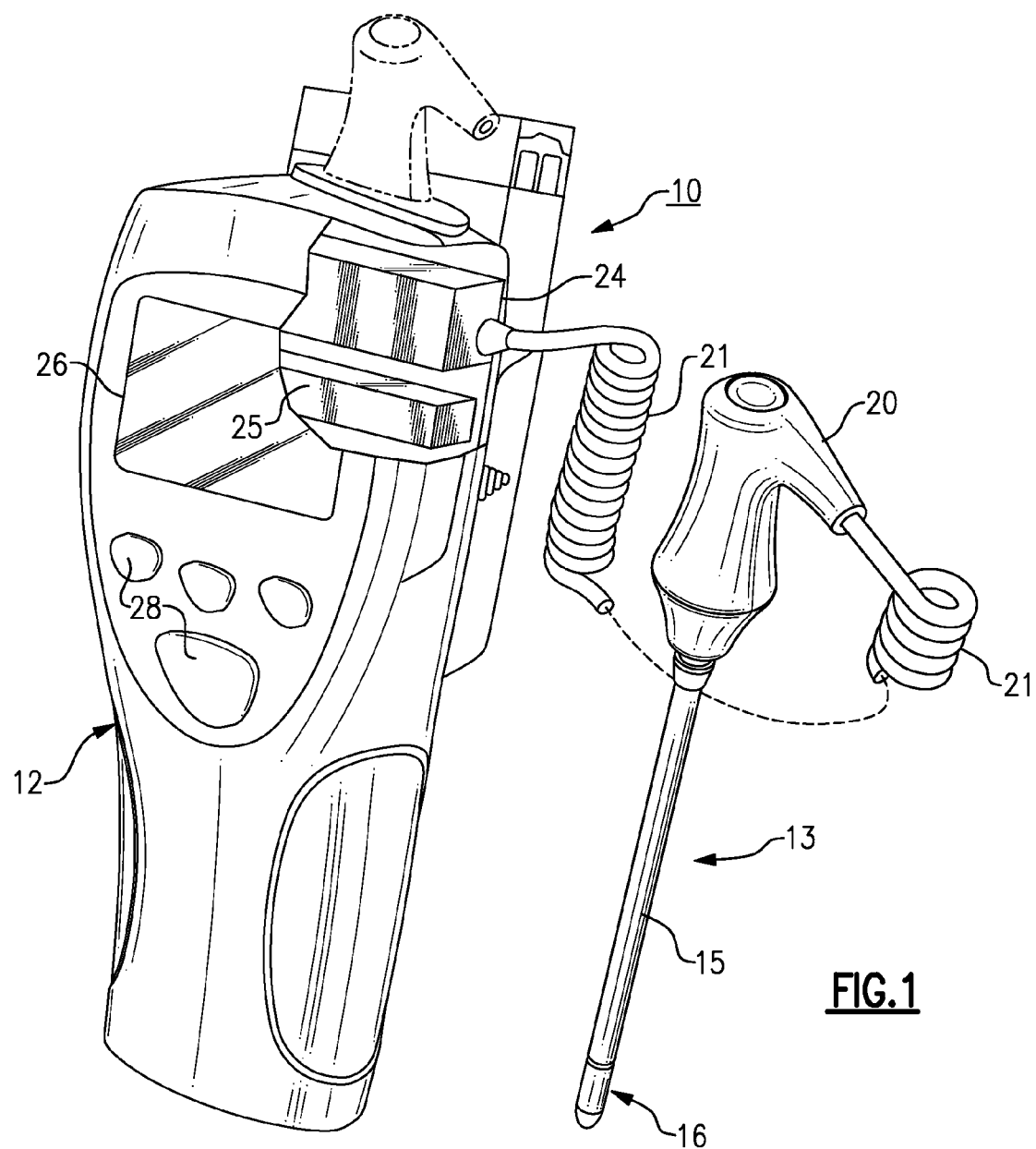
FIG. 1 is a perspective view of a portable electronic thermometer having a temperature sensing probe embodying the present invention with portions of the base housing broken away to show the interior of the housing.

Turning initially to FIG. 1, there is illustrated an electronic thermometer, generally referenced 10, for measuring a patient's body temperature. The thermometer is portable and is intended for use in medical applications. The thermometer includes a compact base housing 12 and a temperature sensing probe 13. The sensing probe includes an elongated hollow shaft 15 having a sensing tip 16 affixed to its distal end. As will be described in further detail below, the tip contains a heating element and a heat sensor. A handle 20 is attached to the proximal end of the probe which, in turn is coupled to the base housing by a flexible cord 21. A micro processor 24 is stored in the housing along with a power supply 25 containing a rechargeable battery (not shown). A screen 26 is located on the face of the base housing for displaying the patient's body temperature along with a series of switches 28-28 by which the user can control the activity of the instrument. The processor contains software for processing temperature related data received from the tip sensor to accurately determine the patient's temperature which is displayed upon the read out screen. The processor may also contain a memory for storing temperature related data as well as patient related data that can be recalled at the option of the user.

Figure 2:
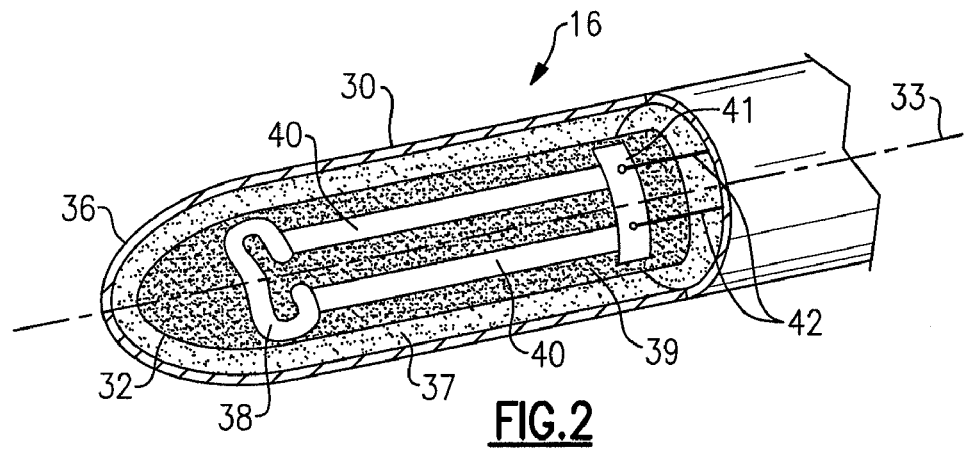
FIG. 2 is an enlarged perspective view of the sensing tip of the probe with portions broken away to show the interior of the tip.
Figure 3:
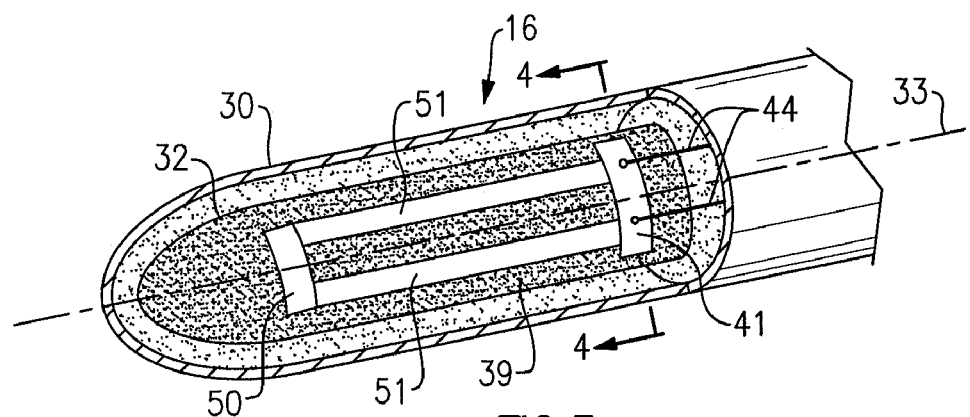
FIG. 3 is a view that is a similar as that shown in FIG. 2 with the tip being rotated a sufficient number of degrees to show another area of the probe.
Figure 4:
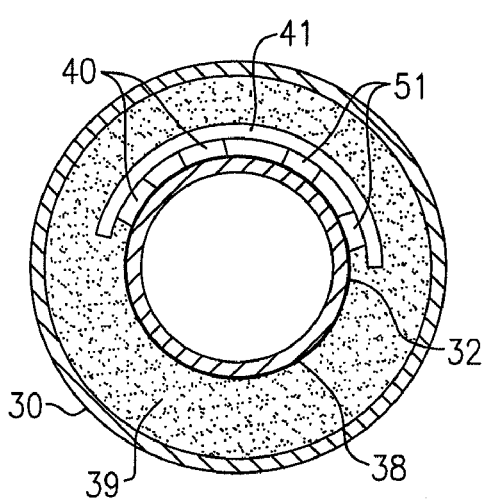
FIG. 4 is an enlarged sectional view taken along lines 4-4 in FIG. 3.

Referring now to FIG. 2-4 there is illustrated in greater detail the sensing tip 16 of probe 13. The tip includes an outer shell 30 that encloses an inner shell 32. In assembly, the two shells are coaxially aligned along the center line 33 of the probe shaft 15. FIG. 2 has a portion of the outer shell broken away to clearly show one half of the inner shell. The outer shell is fabricated of metal having a high coefficient of thermal conductivity and is attached to the proximal end of the probe shaft as by welding or any other suitable bonding procedure capable of forming a lock tight joint between the two co-joined parts. The distal end of the outer shell has a rounded end wall 36 to facilitate easy insertion of the probe into various body cavities.

The inner shell has a shape that generally compliments that of the outer shell. The inner shell is smaller in size than that of the outer shell and is shaped so that a uniform space is established between the two shells. Like the outer shell, the inner shell can also be fabricated of a metal having a high coefficiency of thermal conductivity. One such suitable metal that might be employed is a stainless steel. The inner shell could also be made of any one of many well known plastics or ceramics having good insulating properties.

A thick film resistive heater element 31 is located upon the outer surface of the inner stainless steel shell adjacent to the nose section of the shell. The thick film heater element is printed upon a dielectric layer 39 that is printed directly upon the outer surface of the inner shell. The thick film heater ink and the dielectric ink that are applied to the shell surface are of a well known type that is ideally suited for use in stainless steel substrate applications. Such inks are available from Electro-Science Laboratories, Inc. (ESL). The term thick film ink as herein used refers to a metal based paste that contains an organic binder and a solvent such as ESL-29115 for use in producing resistive heating elements and ESL-4914 that is suitable for use as a dielectric coating over a metal substrate. The dielectric layer 39 can be eliminated where the inner shell is fabricated of a plastic or ceramic material.

The terminal ends of the heater are bonded to a first pair of thick film conductive traces 40-40 that are also painted upon the dielectric layer using a suitable ink. The traces extend back from the nose of the inner shell to the opposite end of the shell. A flexible circuit board 41 is bonded to the ends of the traces and serves to couple the traces to a pair of leads 42-42 that pass back through shaft 13 and the chord 21 into the base housing thus linking the heater element 38 to the power supply 25. The traces can be painted over the dielectric coating 39 using a thick film ink such as ESL-9695 or any other similar product. As should now be evident, mounting the heater upon the inner shell surfaces, rather than inside the shell, considerably reduces the problems associated with mounting a more conventional heater within the space limitation of a small diameter probe tip. In addition, the use of a thick film heater eliminates the need of using a thermistor or any other type of element in the heater circuit for preventing overheating of the tip.

FIG. 3 is a view similar to FIG. 2 wherein the sensing tip has been rotated a number of degrees to show a heat sensor 50 that has been bonded onto a second pair of conductive traces 51-51 that are situated upon the outer surface of the inner shell. Here again the second pair of traces are fabricated of a thick film conductive ink that is placed directly over the previously noted dielectric layer 39. The heat sensor is located at the nose of the inner shell 32 in close proximity to the heater and the second pair of conductive traces run back to the opposite end of the inner shell. The flexible circuit board 41 extends around the shell and engages the two traces to couple a pair of electrical leads 44-44 thereto. The leads are arranged to pass through the probe shaft 15 and the cord 21 into the base housing and are connected to the processor 24 (FIG. 1) placing the processor in communication with the heat sensor 50.

Preferably, the heat sensor is a laser etched ceramic oxide NTC device that has a linear response in a temperature range between 85°-120° F. Accordingly, the device exhibits a predictable decrease in electrical resistance when subjected to an increase in body temperature. A thermocouple or other temperature sensory devices may also be employed as a heat sensor in this arrangement without departing from the teachings of the present invention.

Turning now to FIG. 4 there is illustrated a sectional view taken through along line 4-4 in FIG. 3 to show a typical placement of elements within the shell-in-shell configuration of the present invention. As noted above, the outer shell surrounds the smaller inner shell and the inner shell is provided with a dielectric outer layer 39 at least upon the substrate surface areas in which either a conductive or a resistive thin film ink has been applied. The first pair of thick film traces 40-40 are inked in a close parallel relationship over the dielectric layer. The second pair of thick film conductive traces 51-51 preferably are similar laid down close to the first pair and are parallel to each other as well as to the first pair of traces. The flexible circuit board is placed over the terminal ends of the conductive traces and the previously noted leads are bonded to the circuit board. The space between the two superimposed shells is filled with an epoxy material having a high co-efficient of thermal conductivity. In this arrangement the heat sensor and the heater element are in close proximity and both are in thermal contact with a material that has good heat flow characteristics. Accordingly, the response time of the present thermometer is about half that of a more conventional electronic thermometer.

Figure 5:
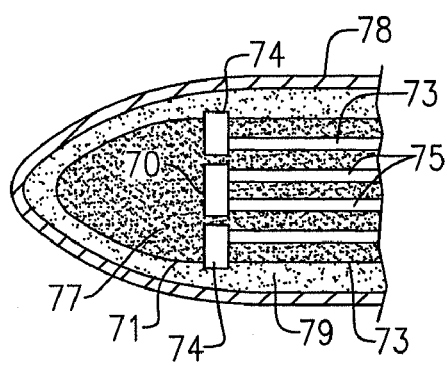
FIG. 5 is an enlarged partial side elevation showing a further embodiment of the invention.

FIG. 5 illustrates a further embodiment of the invention in which a heat sensor 70 is mounted upon the outer surface of the inner shell 71 and is placed in a close relationship with the thick film heater 74 that partially encircles the inner shell. A first pairs of conductive traces 73-73 are connected to the heater 74 and run axially to the back of the inner shell on the outside of a second pair of conductive traces 75-75 that service the heat sensor 70. Here again the outer surface of the inner shell contains a dielectric layer 77 that underlies the electrical components and conductive traces mounted upon the inner shell. Lastly the space between the inner shell 71 and outer shell 78 is filled with an epoxy 79 having a high co-efficient of thermal conductivity.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A thermometry apparatus for determining a temperature of a body that includes:
   a temperature sensing probe that further includes an elongated shaft having a proximal end and a distal end;
   a tip member secured to the distal end of said shaft, said tip member containing an inner shell and an outer shell that are separated by a space, said shells being fabricated of a material having a high heat transfer coefficient;
   a heating element that is mounted upon the outer surface of the inner shell;
   a heat sensor that is also mounted upon the outer surface of the inner shell;
   electrical leads connected to said heating element and to said heat sensor;
   a thermally conductive material filling said space between said shells; and wherein said inner shell contains a first pair of thick film electrical traces extending along the outer surface of said inner shell, said first pair of electrical traces being arranged to electrically couple said heater to a first pair of electrical leads.

2. The apparatus of claim 1 wherein said electrical leads pass through said shaft into a base unit secured to the proximal end of said shaft.

3. The apparatus of claim 2 wherein said base unit contains a processor connected to said leads for controlling said heater and for determining said body temperature from said heat sensor data.

4. The apparatus of claim 2 wherein said base unit contains a readout screen that is connected to said processor for providing a visual display of said body's sensed temperature.

5. The apparatus of claim 1 wherein said inner shell contains a second pair of thick film electrical traces extending along the outer surface of said inner shell, said second pair of electrical traces being arranged to electrically couple said heat sensor to a second pair of electrical leads.

6. The apparatus of claim 5 wherein said heat sensor is a thermistor.

7. The apparatus of claim 6 wherein said heat sensor is a ceramic oxide device.

8. The apparatus of claim 7 wherein the heat sensor is a laser etched NTC device.

9. The apparatus of claim 5 wherein said inner shell contains a dielectric layer that is placed beneath said heating element, said heat sensor and said conductive traces.

10. The apparatus of claim 9 wherein said inner shell is fabricated of stainless steel.

11. The apparatus of claim 5 wherein said inner shell is fabricated of a plastic material.

12. The apparatus of claim 5 wherein said inner shell is fabricated of a ceramic material.

13. The apparatus of claim 5 that further includes a flexible circuit board for connecting said electrical leads to each pair of thick film conductive traces.

14. The apparatus of claim 6 wherein said thermistor has a negative thermal coefficient and a linear response in a range of between 85° F. and 110° F.

15. The apparatus of claim 5 wherein said first pair of thick film conductive traces are mounted inside said second pair of thick film conductive traces.

* * * * *